US012599462B2

(12) United States Patent
Farré Berga et al.

(10) Patent No.: US 12,599,462 B2
(45) Date of Patent: Apr. 14, 2026

(54) DEVICE FOR MAKING, DUPLICATING AND FIXING DENTAL MODELS IN ARTICULATOR

(71) Applicant: TRIMAG SYSTEM, S.L., Lleida (ES)

(72) Inventors: Ramon Farré Berga, Lleida (ES); Oriol Farré Berga, Lleida (ES)

(73) Assignee: TRIMAG SYSTEM, S.L., Lleida (ES)

( * ) Notice: Subject to any disclaimer, the term of this patent is extended or adjusted under 35 U.S.C. 154(b) by 386 days.

(21) Appl. No.: 18/006,486

(22) PCT Filed: Jul. 23, 2021

(86) PCT No.: PCT/EP2021/070761
§ 371 (c)(1),
(2) Date: Jan. 23, 2023

(87) PCT Pub. No.: WO2022/018291
PCT Pub. Date: Jan. 27, 2022

(65) Prior Publication Data
US 2023/0329847 A1 Oct. 19, 2023

(30) Foreign Application Priority Data
Jul. 24, 2020 (ES) ............................... ES202030771

(51) Int. Cl.
*A61C 11/08* (2006.01)
*A61C 13/00* (2006.01)
(52) U.S. Cl.
CPC ........ *A61C 11/087* (2013.01); *A61C 13/0027* (2013.01)
(58) Field of Classification Search
CPC ........ A61C 11/00; A61C 11/087; A61C 11/08
See application file for complete search history.

(56) References Cited

U.S. PATENT DOCUMENTS

| 3,221,408 | A | * | 12/1965 | Scullin | A61C 11/02 |
| | | | | | 433/60 |
| 3,510,947 | A | * | 5/1970 | Tuccillo | A61C 11/08 |
| | | | | | 433/60 |

(Continued)

FOREIGN PATENT DOCUMENTS

| DE | 4317473 A1 * | 12/1994 | ............. A61C 11/08 |
| WO | 93/01762 A1 | 2/1993 | |

(Continued)

OTHER PUBLICATIONS

International Search Report Corresponding to PCT/EP2021/070761 mailed Nov. 23, 2021.

(Continued)

*Primary Examiner* — Heidi M Eide
(74) *Attorney, Agent, or Firm* — Finch & Maloney PLLC

(57) ABSTRACT

A device for making, duplicating and fixing dental models in articulator, using dental replicas (19) of plaster or other material with bases (20) for the manufacture of dental models (18). The device incorporates at least three pins (3) that have elements to be embedded in the bases (20) in charge of said pins (3) for positioning and fixing the dental models (18) to platens (7) that have a minimum of three protruding protrusions (8) on its surface and arranged to fit with the pins (3) and, where appropriate, provide a releasable connection with the pins (3). The platens (7) are attached to the articulator (1) with a height or ratio (h) between protrusions (8) of the platens (7), upper and lower, preset and reproducible.

13 Claims, 5 Drawing Sheets

(56)          References Cited

U.S. PATENT DOCUMENTS 3,653,126  A  *  4/1972  Hansen  .................. A61C 11/08
                                                  433/60
3,808,689  A  *  5/1974  Spinella  ................ A61C 11/02
                                                  433/60
4,200,981  A  *  5/1980  Fine  ....................... A61C 11/08
                                                  433/60
4,319,875  A  *  3/1982  Beckwith  ............... A61C 11/08
                                                  433/60
5,352,117  A  *  10/1994  Silva  ................... A61C 11/001
                                                  433/34
5,573,397  A  *  11/1996  Silva  ................... A61C 11/001
                                                  433/56
5,611,686  A  *  3/1997  Silva  ..................... A61C 11/08
                                                  433/74
5,730,593  A      3/1998  Mack
5,749,725  A      5/1998  Chinlund
5,842,857  A  *  12/1998  Andrews  ............... A61C 11/00
                                                  433/59
5,967,776  A  *  10/1999  Kim  ...................... A61C 11/08
                                                  433/54

7,338,283  B2      3/2008  Honstein et al.
7,690,919  B2      4/2010  Huffman
2006/0228665  A1 *  10/2006  Garland  ................. A61C 11/02
                                                  433/60
2007/0190480  A1 *  8/2007  Gambacorta  ......... A61C 11/08
                                                  433/60
2008/0118888  A1 *  5/2008  Karroum  ............... A61C 11/08
                                                  433/54
2008/0206704  A1 *  8/2008  Jung  ..................... A61C 9/002
                                                  433/60
2020/0093580  A1 *  3/2020  Cheung  ................. A61C 11/06

FOREIGN PATENT DOCUMENTS

WO          2008/103481  A1      8/2008
WO          2013/169054  A1      11/2013

OTHER PUBLICATIONS

Written Opinion Corresponding to PCT/EP2021/070761 mailed Nov. 23, 2021.

* cited by examiner

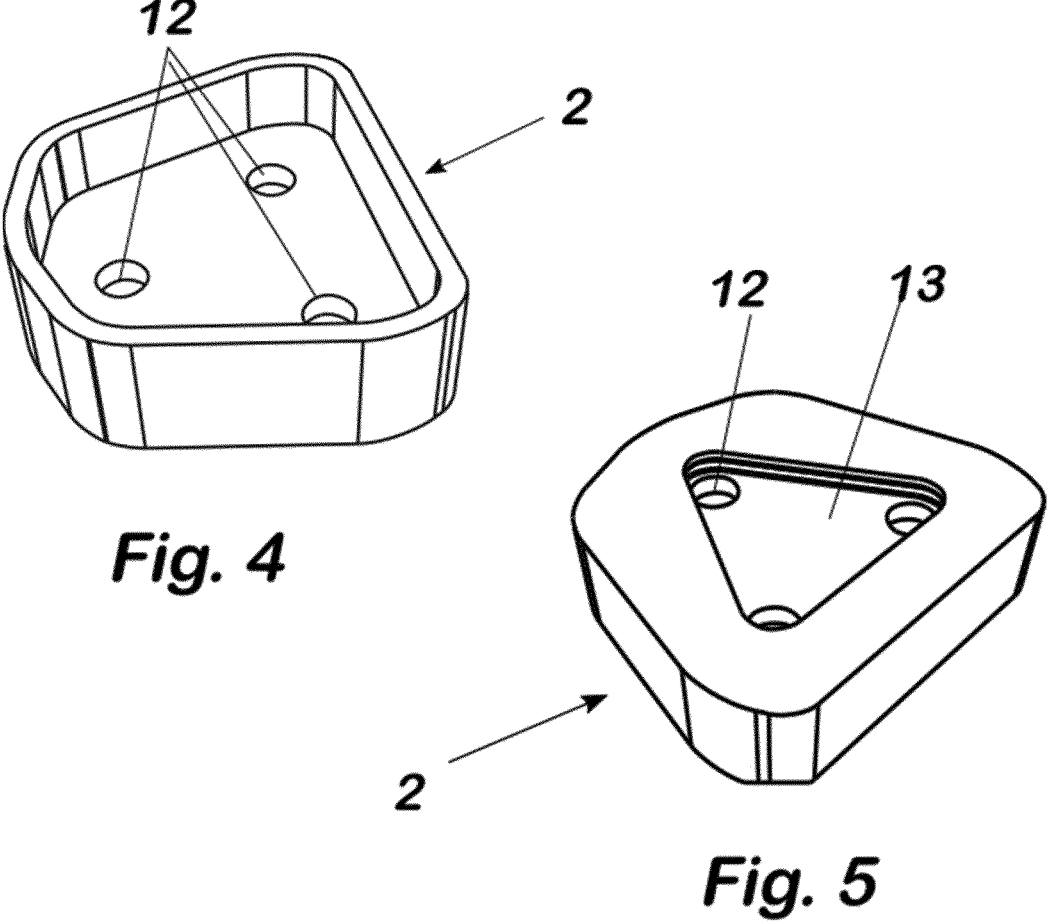
Fig. 4
Fig. 5
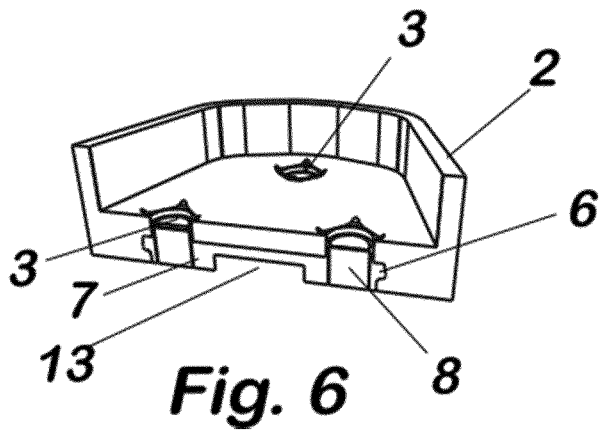
Fig. 6

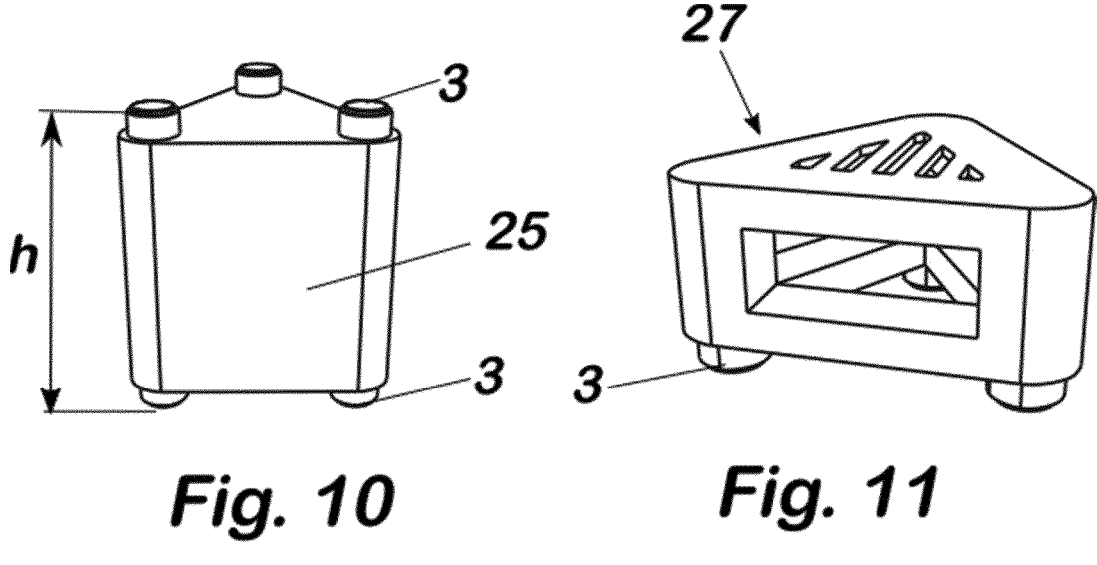
Fig. 10          Fig. 11
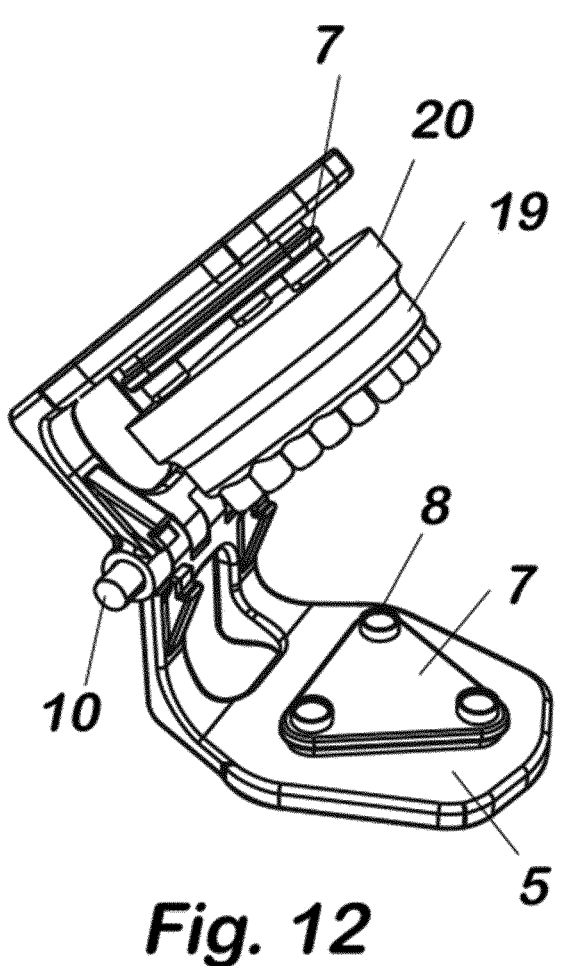
Fig. 12

DEVICE FOR MAKING, DUPLICATING AND FIXING DENTAL MODELS IN ARTICULATOR

FIELD OF THE INVENTION

The present invention develops a device for making, duplicating and fixing or mounting dental models made of plaster or other material in articulators in the field of dentistry, which allows its use with articulators from different manufacturers and the adaptation of dental replicas to the articulators, including those obtained by CAD/CAM ("Computer Aided Design & Computer Aided Manufacturing"), thus obtaining independence between said dental models and the articulator, from which they can be easily unlinked and rejoined, also allowing to reproduce in each pair of dental models the patient's intermaxillary relationship with precision in any articulator or CAD/CAM software. The process of elaboration, duplication and assembly of the models is simplified, thus reducing the complexity and the time for obtaining them; the number of means used is reduced, this lowering costs with respect to the known art; in the preparation, duplication and fixation of dental models to articulators.

BACKGROUND

Given the need to perform oral rehabilitation, health professionals need copies or models of the patient's teeth that they use in an articulator to reproduce the intermaxillary relationships and the bite for a correct study, diagnosis and treatment. This makes it possible, for example, to make a prosthesis that can subsequently be precisely fitted to the patient.

A first step is to obtain a dental impression or record of the patient's teeth using impression trays. These are negative molds of the teeth obtained in alginate, silicone or any other impression material, as well as by means of an intra-oral scanner in the case that the CAD/CAM system is used. Said dental impressions are subsequently transformed and positivized into replicas of the patient's teeth by casting these previously obtained molds with plaster or by means of 3d fabrication if the CAD/CAM system is used. Subsequently, a base is made for the dental replicas to obtain the dental models, and thus facilitate their attachment to a dental articulator with the aim of reproducing the relationship between the upper and lower teeth and the mechanical adjustments of the mouth, or namely, the bite, which is a typical and specific element of each person.

Articulators are devices that aim to fix and position the upper and lower dental models of a patient, reproducing their bite, in relation to the reference planes of the articulator. The articulator is a hinge mechanism, which rotates around one or more axes, the purpose of which is to reproduce the mandibular movements and the bite, which are characteristic and individual for each patient. The adjustment, fixation or mounting of the dental models in the articulator is done using a mounting plaster, and manipulation thereof, skill and experience are essential to obtain a copy of the patient's teeth that is accurate, clean and useful.

Before mounting in the articulator, it is necessary to prepare the dental replicas obtained by taking records. The process of adding a base to each dental replica to make a dental model, prior to mounting in the articulator, is called capping. In the state of the art, different types of skirting boards are used, usually rubber bases, trays or basins to form plaster bases. It is known to add a metal sheet to the base of the plaster to be used with magnetic elements embedded in the plaster for mounting or fixing to the articulator, as will be described later. Plastic material bases or platens with projections are also known to facilitate the relationship and fixing of said base in the mounting plaster. They can also feature on the outside protrusions for engagement and cavities for the installation of metallic and/or magnetic elements.

The purpose of these bases is to relate the dental replicas to the articulator so that they can be fixed using the mounting plaster, thus leaving the dental models positioned three-dimensionally in the articulator. There are also intermediate platens that can be separated from the articulator through different fitting and fixing means, and these platens are related to the bases of the dental models by means of mounting plaster or any similar material (adhesive). Thus, in the known art, the bases used are usually associated directly with the mounting plaster of the dental models to an intermediate platen or directly to an articulator. As the base of the dental model is always joined by the mounting plaster to the articulator or intermediate platens, this connection is unique for each case and is not removable or reusable, such that the prosthetist needs an articulator or a pair of platens exclusively for each pair of dental models or patient.

In summary, the union of the dental models with the articulator can be direct by means of dental plaster, this is the case of U.S. Pat. No. 7,690,919 B2 or U.S. Pat. No. 7,338,283 B2. Also the art uses an intermediate platen, for example, in US 2008/0118888 A1. The joint of the platen with the articulator can be screwed as in U.S. Pat. No. 3,653,126 or magnetized as in U.S. Pat. No. 5,730,593, or directly attached with plaster. The union of the platen with the plaster model is always direct, using plaster. Also known from U.S. Pat. No. 5,749,725 is a connection of the platen against another intermediate platen, but in any case there is always a platen attached directly to the base of the dental model by means of plaster. In conclusion, the intermaxillary relationship is determined by the direct union with plaster, or any similar material that has the same function, between the dental model, either with or without a base, with the articulator, with or without an intermediate platen. In all these cases, the setting process of the plaster in an articulator mounting is complex, and the dental models can be off-center and the plaster can dirty the hands, the table, the models themselves, as well as the articulator and the platens.

As already mentioned, in the event that the bases are made of plaster and attached to the base surfaces of the articulator or the intermediate platen, the dental model obtained is inseparable from the articulator or the platen respectively, and must be delivered for use in conjunction with the dental model. This situation is common in a part of the state of the art and is expensive because it forces professionals to have an articulator or a pair of platens for each case to be rehabilitated, this increasing the costs of making, mounting, transferring and storing dental models.

Documents U.S. Pat. No. 5,352,117 and WO 2008/103481 describe articulators whose dental models are separable from them and can later be properly re-attached to said articulators, but in fact they are not independent from it. They neither have a complete system for copying and creating dental models, nor do they allow the adaptation of dental models created for an articulator other than their own.

In dental models whose bases have a metal platen and can be detached from the magnet embedded in the mounting plaster to the intermediate platens or to the articulator directly, the interlocking surfaces between the plaster of the model base and the mounting plaster, poses the problem that there is a great deal of contact area between them, so that with a minimum particle of dirt that gets in the way, a gap can be created that distorts the relationship and vertical dimension between the models and the platen or the articulator, which leads to a faulty fit of the fabricated prosthesis when it is placed in the mouth. In addition, it is also necessary to keep the two platens with the models, the magnets embedded in the mounting plaster or the entire articulator, together with the mounting plaster with which they have been fixed, in order to preserve the intermaxillary relationship.

It is important to highlight that, in the known art, the process of capping to obtain the bases of the dental models and the process of mounting the dental models in the articulator are two separate and independent processes. First the capping is made, and then the articulator assembly. Likewise, when making a copy or duplicate of the dental models, first the duplication is carried out and then the assembly in the articulator, also in two separate and independent processes.

The objectives of the present invention are to:

Provide a device that allows the making of a dental model that incorporates a linkage to the platen at its base to be fixed in an articulator. This linkage has to be removable and allow an optimal and precise adjustment of the dynamic relationships established in the dental models when they are related to the platens in the articulator.

Allow the dental models to be operatively separable from the articulator platens and to be used later in the same or in another one without losing the qualities and dynamic properties initially established of the dental models.

Obtain a device that facilitates the operator's work and represents an economy of resources and means, even a reduction of work time, in obtaining the dental model and mounting it in the articulator, as well as in its subsequent use.

Facilitate the copy or duplication of dental models, as well as their assembly in an articulator, thus reducing the time for obtaining them, as well as the quality of said copies or reproductions.

Enable the adaptation of dental models with all types of conventional or virtual articulators (CAD/CAM), of those existing in the known art, by means of appropriate adapters as will be described later.

These and other advantages of the present invention will become more apparent from the description thereof that follows.

BRIEF SUMMARY OF THE INVENTION

The present invention develops a device for making, duplicating and mounting or fixing dental models in articulators, in the field of dentistry, a device that simplifies the process of making and mounting said dental models in articulators, as well as their copies or duplicates, thereby reducing the complexity and the time for obtaining them, and allowing their independent use with different articulators known in the art, including the use of dental models obtained by CAD/CAM.

Said device also includes its own dental articulator, which is succinctly a mechanism with two arms with bases, spaced apart and attached to a vertical axis articulated around an axis, said bases allowing the placement of platens that have a minimum of three magnets or protrusions that protrude from its surface. The platens can be moved away or approached in the articulator to a position of maximum approach, in which they are parallel to each other, the closing stroke of the articulator being limited by means of opposing stops or other means at a fixed, predetermined and reproducible height.

In the present invention, unlike the prior art, the creation of the base, or capping, of each upper and lower dental replica is carried out in the same process to obtain a dental model, as well as the fixation of each pair of dental models in the articulator. In other words, the capping process and the mounting of the dental models in the articulator are carried out in the same operation or process.

For this, a rubber basin or tray is used with the particularity that it has a minimum of three holes in which pins are placed that plug and prevent, when the plaster casting is poured, that it exceeds them, leaving said pins embedded in the base of the dental model when the plaster sets. At the bottom, said tray has a recess where a platen is inserted with a minimum of three protrusions or magnets that protrude from its surface and are inserted in the aforesaid holes of the tray and are in contact with the pins that are metallic and that adhere to said magnets or protrusions.

In another embodiment, the pins are also magnetic and of opposite polarity to that of the respective magnet of the platen to allow and facilitate the union, fixation and positioning, between the base of the dental model and the platen. In another embodiment, a minimum of three pins are joined by a metal plate at the base of the dental model that is capable of positioning itself thanks to the protrusions of the platen, linking protrusions and pins by box and tenon, while a central magnet of the platen performs a magnetic retention with the metal sheet that joins said pins. In this last embodiment, the tray is provided with a hole in its base that is plugged by the metal plate and the pins in combination with the magnetized disc and the protrusions of the platen. A minimum of three pins positions the dental model three-dimensionally with the protrusions of the articulator platens, thereby generating a plane of union and bonding between the articulator platen and the dental model pins.

In all the embodiments, the relationship between the contact points of the dental model base pins and the protrusions or magnets of the articulator platens is fixed, predetermined, and reproducible. It could be called "master" relationship or height (h), or reference relationship, and it is used to three-dimensionally position the intermaxillary relationship of the two dental models in relation to the two platens of the present invention. These platens can be fixed and adapted to any articulator by using plaster or any similar material, as long as the "master" or (h) relationship between the platens of the present invention is respected. The "master" relationship (h) and all its elements combined can also be entered into virtually any CAD/CAM design software.

To this end, the invention includes a platen positioner that reproduces the "master" relationship (h) that is included in the articulator itself, when its arms are in parallel arrangement and in their maximum proximity. This platen positioner, as will be described later, makes it possible to adjust this "master" relationship (h) between platens to articulators of the known art, both for the preparation of dental models or their duplicates and their mounting in any articulator, as well as for the adaptation and use of dental models, or their duplicates as articulated and created with the device of the present invention.

The pins, in one of the preferred embodiments, as described in the present specification, are metallic pieces or magnetic plastic formed by a base configured to facilitate the connection with the protrusions or magnets of the articulator plate, and upper protrusions configured to facilitate the sealing of the holes in the tray or rubber basin and its fixation to the base of the dental model. Said base of the pin can incorporate projections, recesses and/or protrusions or other elements for centering with respect to the magnets or protrusions of the platen, which would have counter elements.

The invention also includes a double positioner for dental replicas that allows, once the patient's bite has been established in the dental replicas, to fix and retain it in said double positioner. The double positioner is similar to a ring that surrounds the adjusted dental replicas and that has retentions, tips or nails that fix with the help of an adhesive, such as wax, silicone or another, this positioner together with the dental replicas.

The double positioner has legs or anchoring means, with the ability to rotate, to the axis of the articulator of the invention, so that it can be assembled therein and used to retain the dynamic relationship in dental replicas while the plaster bases are being created, capping process, and is fixed in the articulator, assembly in the articulator, by means of trays or rubber basins, pins and platens located in the bases and arms of the articulator. In this way, the base of the two models is made and mounted or fixed in the articulator in the same process with the two dental models at the same time, upper and lower, so that the two models are articulated, centered and clean in the articulator.

All the elements described, except the double positioner for dental replicas and the platen positioner, are also useful and suitable for duplicating and mounting dental models in an articulator in a single process. To this end, the invention includes a positioner for the mold for making the duplicate, which has a height slightly less than half the height of the platen positioner. At one end of same, the magnets or protrusions of the platen are positioned, and at the other there are some irregularities so shaped to fix the material of the mold to make the duplicate of the dental model and thus be able to fix its relationship to the magnets or protrusions of the opposite platen of the articulator.

Finally, the present device allows the use of dental replicas created by means of scanning technology of the teeth and manufacturing by CAD/CAM techniques, after previously introducing in the design software the relationship "master" (h) of the protrusions or magnets of the platens to which the base pins of the dental models will be attached. In extra-oral scanning it allows that, when scanning the magnets or protrusions of the platen, the "master" relationship (h) between the virtual platens of the present invention can be positioned three-dimensionally in the design software. Subsequently, any dental model that is positioned on the previously scanned platen will allow the scanned dental model to be positioned virtually in the software, automatically relating it within the "master" (h) relationship, without the need to scan the bite. In intra-oral scanning, any dental model created by CAD/CAM may incorporate the negative shape of the pins in its base, which will allow the pins to be positioned in their base to mount it and relate it directly to the platen of the present invention mounted on any articulator, provided that the latter has been previously adapted by means of the platen positioner and respects the "master" relationship (h) of the present invention.

In this way, all the objectives envisaged by the invention have been obtained, resulting in a set of elements that allow the elaboration, duplication and fixation of dental models in an articulator from a replica of a patient's teeth, as well as the adaptation to any articulator or CAD/CAM design software, in a clean, simple, versatile and economical way, also allowing the reduction of costs and work time necessary to obtain them and facilitating their transport and storage. All this improves the work of dental health professionals.

BRIEF EXPLANATION OF THE GRAPHICS

For a better understanding of the invention, the present specification is accompanied by five sheets of graphics, provided by way of illustration and not limitation of the invention.

FIG. 4 is a top perspective representation of a rubber tray or basin in accordance with the preferred embodiment of the present invention.

FIG. 5 is a representation, bottom view, of the tray of the preceding figure.

FIG. 6 is a sectioned perspective view of a platen positioned in the lower part of the tray whose protrusions or magnets go through the holes in said tray, and pins that seal the holes to receive the plaster cast and make the dental model or its duplicate and the assembly in an articulator.

FIG. 10 is a perspective representation of a platen positioner of the present invention, in one of its possible embodiments, which reproduces the height or ratio (h) or "master" of the articulator of FIGS. 1 and 2.

FIG. 11 is a perspective representation of an embodiment of a positioner for the duplicate mold according to the present invention, in one of its possible embodiments, which reproduces an approximate relation to (h/2), half or less than half of said height "master" (h) of the preceding figure.

FIG. 12 is a perspective representation of an articulator according to the preferred embodiment of the present invention in which the upper dental model is removably linked to the three magnets or protrusions of the upper platen of the articulator and the bottom platen is instead empty showing the three magnets or protrusions that protrude from its surface.

Figure 15:
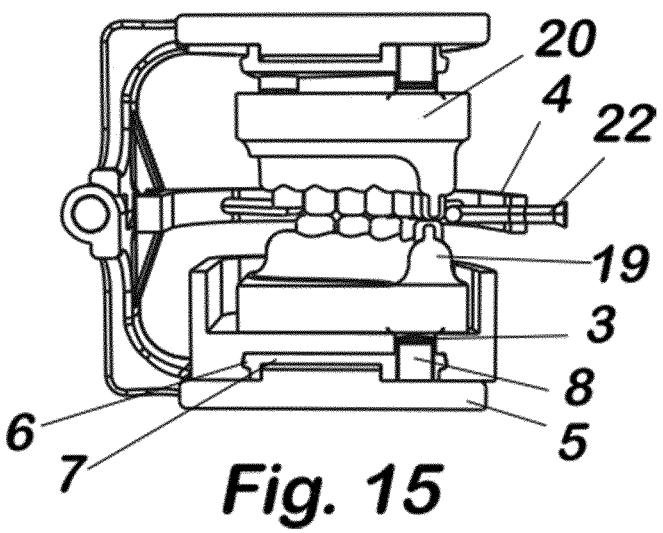

FIG. 15 is a cross-sectional elevation view of an assembled dental articulator with the dual positioner and the upper and lower dental casts. The section allows to appreciate the setting of each item. The lower arm of the articulator shows the tray used in FIG. 3. The two dental models are also seen, each consisting of the dental replica, the plaster base, and the pins.

The platens, pins and fixation elements can be appreciated in such a way that the independence of the dental models from the platens and the articulator itself is visible, according to the present invention.

DETAILED EXPLANATION OF THE INVENTION

The present invention consists of a device for making, duplicating and fixing dental models (18) in dental articulators, of the type of plaster models or other material, within the field of dentistry, including a dental articulator (1), platens (7) with protrusions or magnets (8), trays (2), pins (3), a platen positioner (25), a double positioner for dental replicas (4), and a positioner for the duplicate mold (27)

Figures 1, 2, 3:
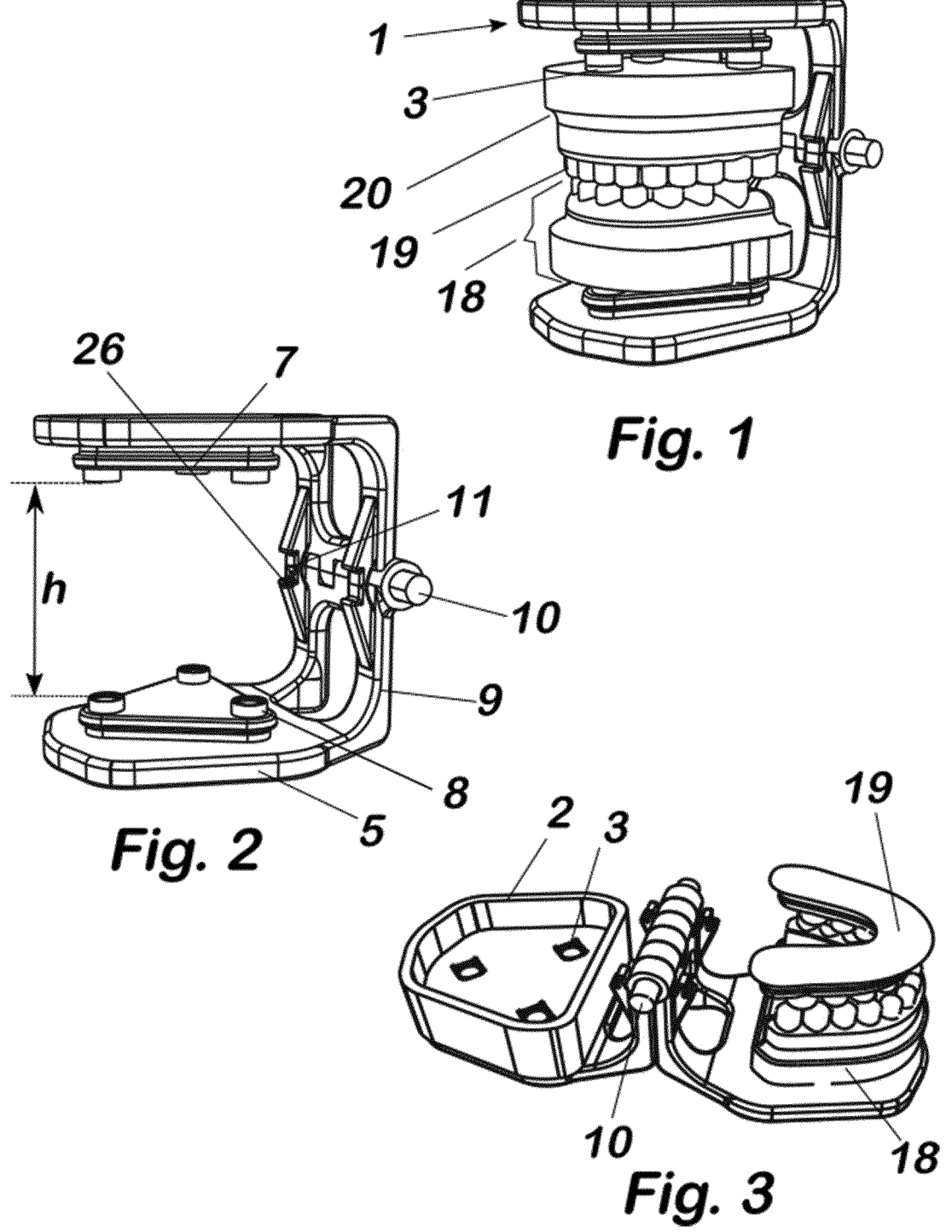
FIG. 1 is a perspective representation of an embodiment of the present invention showing an articulator in the closed position and a pair of articulated dental models, that is, it reproduces the specific bite of a patient.
FIG. 2 is a perspective view of the articulator in its closed position with its arms in maximum proximity position, showing the platens on each arm of said articulator. A "master" height or (h) is indicated, which is the distance between the protrusions or magnets of the platens.
FIG. 3 is a perspective representation of an articulator in its open position in which a tray with pins is on one arm, while on the other and removably on its platen is an upper dental model and the lower dental replica, adjusted to each other and reproducing the bite, to transform said lower dental replica into a dental model.

The dental articulator (1) consists of a mechanism that has two arms (5) to which are removably attached some platens (7) spaced apart and attached to a vertical central stem (9), said stem (9) being articulated with the ability to rotate around a horizontal axis (10) so that the platens (7) have the ability to approach or move away from each other. For example, FIGS. 1 and 2 show said dental articulator (1) with the platens (7) in the maximum approach position, while FIG. 3 shows said articulator (1) in an open position and with the platens (7) separated to the maximum.

The dental articulator (1) has a mechanism for limiting the closure or approximation of said platens (7) by means of antagonist stops (11) located on each arm of the dental articulator (1). Unlike the embodiment shown in the figures, many other ways of making said stops are possible without altering the essence of the invention. For example, adjustable screws, vertical cylindrical projections on each arm, etc.

In this position of maximum approach of the articulator arms, the separation between the protrusions or magnets (8) of said platens (7), upper and lower, determine a fixed height or relationship (h) for the articulator, which is called in this description "master" height. This "master" height, or (h), is the point of contact between the pins (3) of the dental models (8) and the protrusions or magnets (8) of the platen (7), which are a minimum of three points for each platen (7) that define a plane each. The relationship between these two planes defined by a minimum of three points on each platen (7) will be used to adapt this method of making, duplicating and fixing dental models (18) to any articulator, thanks to the platen positioner (25) that reproduces the "master" (h) relationship, as well as any CAD/CAM design and manufacturing process, as will be described later.

Figure 13:
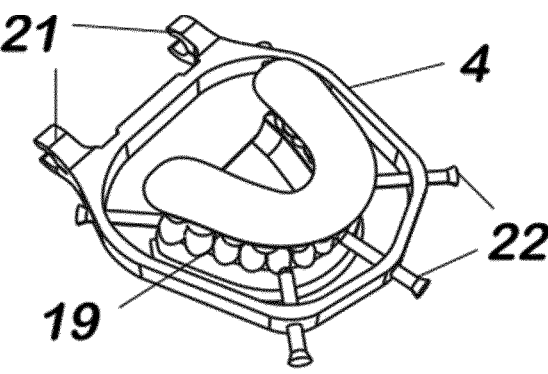
FIG. 13 is an embodiment of a double positioner for dental replicas, in this case showing tips used to fix the dental replicas therein.

The dental articulator (1), particular of the present invention, also incorporates shelves or supports (26) for holding the double-positioner (4) of dental replicas (19), so that the preparation of dental models (18) and assembly in the articulator (1) is easy, clean and centered (FIGS. 13 and 15). Also, the invention incorporates a positioner for the mold for duplicating (27) the dental models (18), to facilitate both the preparation and the positioning and fixation of the duplicated dental model (18) thanks to the tray (2) and the connection between the pins (3) and the protrusions or magnets (8) of the platens (7) of the articulator (1), all in the same process, as will be described later, when analyzing FIGS. 11 and 14.

The starting point of the invention is the use of dental replicas (19) until they become dental models (18) (or their duplicates) with their base (20) with pins (3), and mounted or fixed to magnets or protrusions (8) from the platens (7) on the articulator. In a first embodiment, the case of obtaining it by manual means is dealt with. In another possible embodiment, these replicas (19) can be obtained from the patient's teeth by means of a digitization process and the subsequent 3D fabrication (CAD/CAM) of the dental models (18).

Figure 8:
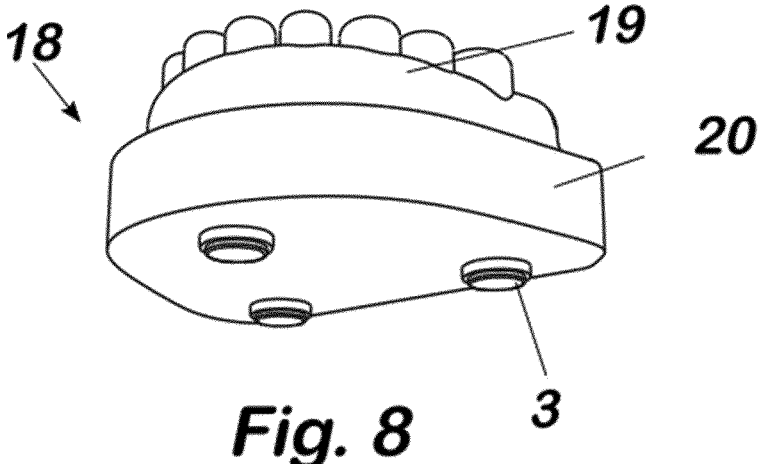
FIG. 8 is a bottom perspective view of a dental model created in accordance with the present invention. The characteristic pins of the aforementioned can be seen protruding from the plaster base.

It should be taken into account that, in the state of the art, the assembly of the replica plus its base (capping process) is called a dental model. In the present invention, on the other hand, since the base and assembly are completed in the same process, the pins (3) are inserted into the base (20) of the dental model (18). Therefore and distinctively, in the present invention, a dental model (18) includes the dental replica (19), the plaster base (20) and the pins (3) that are embedded in said base (20), as shown in FIGS. 1 and 8.

The manual process first obtains a dental impression of each dental arch of the patient, teeth and gums, usually made of alginate, silicone, etc., which is a negative of the denture. The next step is the casting of said dental impression with plaster to obtain a dental replica (19) in plaster. This dental replica (19), upper and lower, of the teeth must be completed with a base (20) that allows making the dental models (18), to assemble, fix or mount them, by combining the pins (3) and the tray (2), to the magnets or protrusions (8) of the platens (7) of the dental articulator, in the same and only process.

The particular tray (2) of the present invention acts in combination with the pins (3) also characteristic of the invention and with the platens (7) with a minimum of three protrusions or magnets (8), in a configuration that is unique and also characteristic of the invention.

FIGS. 4, 5 and 6 illustrate the characteristics of the tray (2). It has holes (12) that pass through its bottom and a lower recess (13) suitable for the insertion of a platen (7). As shown in the section of FIG. 6, the magnets or protrusions (8) of said platen (7) protrude therefrom it and occupy said holes (12), while on the upper and internal part of the tray (2) the pins (3) that plug said holes (12) are arranged, preventing that, when pouring the casting onto the tray, the plaster for making the dental mold (18) or the material for making the mold for the duplicate thereof, from pouring through said holes (12) towards the magnets or protrusions (8) of the platen (7) of the articulator. The linking of these elements prevents the material used to create the base (20) of the dental model (18) or its duplicate (the same one used for the assembly), from contacting the platen (7), the magnets (8) or the articulator, thus facilitating the process of making, duplicating and mounting the dental models (18) in the articulator, thereby keeping all the elements clean and centered, and reducing the time and resources used with respect to the state of the art.

The platen (7) fits in the lower recess (13) and in the holes of the tray (2) and thanks to the relative elasticity of the material of said tray (2), its projection (6) is inserted into an internal perimeter socket of the lower recess (13) of the tray (2), it being securely fixed, as shown in FIGS. 6 and 15.

Figure 7:
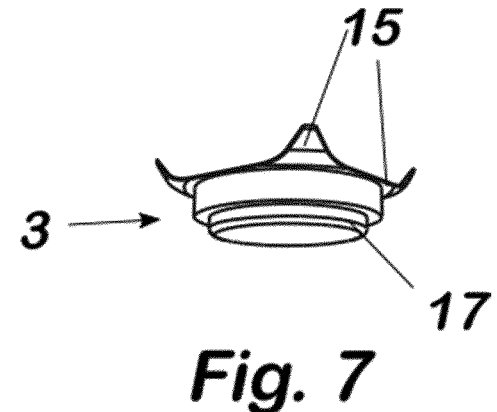
FIG. 7 is a perspective view of a characteristic pin of the present invention in one of its preferred embodiments.

The pins (3) of this preferred embodiment, such as those shown in FIGS. 6, 7 and 8, are metallic or magnetized plastic, have a base built with the exact measurements to fit and plug the holes (12) of the tray (2) and fixing means in the plaster, such as nails, tabs or an annular base (15), the wall of the pin itself, cavities and/or projections or protrusions of said base. This example, shown in FIG. 7, has a lower protrusion (17) or a centering protrusion on the body of the protrusion or magnet (8) which respectively has an opposing shape.

In another possible embodiment of said pins (3), they can be magnetized or be magnets. It is understood that the sign of their polarity is inverse to that of the protuberances or magnets (8) to which they have to be attached. In that embodiment, not only a strong bond is obtained, but also oriented and centered by the orientation of the flux of the respective magnetic fields.

Figure 9:
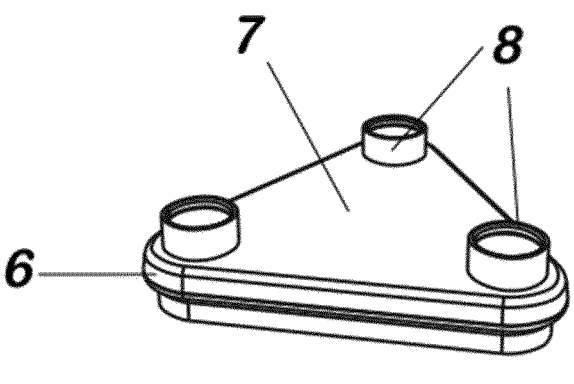
FIG. 9 is a perspective of a platen incorporating a minimum of three fixing and positioning elements according to the preferred embodiment of the invention shown in the graphics of FIGS. 1 and 2.

FIG. 8 shows a base (20) of a dental model (18) made thanks to the tray (2), characteristic of the present invention, which has three pins (3) incorporated into its surface. The invention uses at least three pins (3), as contact, fixing and positioning elements between the base (20) of the dental model (18) and the magnets or protrusions (8) of the platen (7) of the articulator (FIGS. 8 and 9).

It should be noted in particular that three points unequivocally define a plane, so that once the base (20) has been created and is adhered to the dental replica (19), said base (20) having the pins (3) installed therein, when making the dental model (18) of the present invention, said assembly reproduces a precise plane in its relationship with the platen (7) and its three protrusions or magnets (8), and with its platen (7) and opposed magnets (8), that is, the dental models (18) are related within the predetermined (h) or "master" relationship, and is reproducible in any articulator or CAD/CAM design software.

Thus, the dynamic relationships of the dental models (18) of the patient have been fixed, also allowing said dental models (18) to be separated from the platens (7) of the articulator and to join them again, contacting the pins (3) with the magnets (8) of the platen (7), and said union will always reproduce the dynamic relationships of the dental models (18) that are implicit in the pins (3) embedded in their incorporated bases (20).

It is particularly noticeable, as can be seen from FIG. 8 and can be appreciated in FIGS. 1, 12 and 15, that the bases (20) of the dental models (18) are not in direct contact with the platens (7), there existing when magnets (8) and pins (3) join a gap between dental model (18) and platen (7), which is determined by the thickness of the base or bottom of the tray (2) with which it has been made and mounted the dental model (18) or its duplicate. The relationship between magnets (8) of the platen (7), pins (3) and the bases (20) of the dental models (18) and that houses the dynamic relationships built with the articulator to create the relationship between the two dental models (18) with respect to the protrusions or magnets (8) of the platen (7), only lies in these protrusions, there being formed at least a minimum of three contact areas between magnets (8) and pins (3) that define with precision and without interference from other additional points, the joint plane of each dental model (18) in relation to the height (h) or "master", said height being predetermined and reproducible in any articulator or CAD/CAM software.

This construction improves the known art in that the use of contact surfaces, more or less flat, which leads to a minimum impurity misaligning the reference plane, which will subsequently result in a deficient prosthesis in the patient. Furthermore, it is no longer necessary to keep neither the articulator nor the platens to maintain the inter-maxillary relationship of the dental models, since this relationship is implicit in the pins (3) embedded in the base (20) of the dental model (18) made by means of the present invention. This implies less associated costs and requires less space for the transport or storage of dental models (18), since their volume decreases considerably with respect to the prior state of the art.

There are different procedures to make the dental models (18), that is, the union of the dental replicas (19), of the upper and lower teeth, to their bases (20) with pins (3), to be mounted on the articulator reproducing the bite of the patient, when the articulator is closed, by linking the pins (3) and the protrusions or magnets (8) of the platens (7) of the articulator. We now describe an example of a possible embodiments of the present invention.

The double positioner (4) of the dental replicas (19) allows, once the patient's bite has been reproduced, to fix it in a position centered on the articulator (1), so that said relationship is not altered while the bases are created (20) and the dental models (18) articulated and fixed by means of the three pins (3) to the magnets (8) of the platens (7) of the articulator (1) are built, in the same process. FIG. 13 illustrates said double positioning device (4) that consists of a rotating clamping part (21) that allows it to be linked rotatably to the axis (10) of the articulator (1); it also has respective elements for fixing the dental replica (19) to the device, such as any fixing material (silicone, plasticine, etc.), tips (22) or nails, of suitable dimensions that are put in contact with the replica dental (19) and attached thereto with an adhesive, for example wax or silicone. The union of said tips (22) to the double positioner (4) is also fixed in the same way or by means of threading mechanisms.

The double positioning assembly (4), by fixing the dental replicas (19), allows to work comfortably to make and assemble the two dental models (18) articulated with the bite by means of the pins (3) embedded in their bases (20) to the protrusions or magnets (8) of the platens (7) of the articulator (1). In other words, it enables the bases (20) of the dental replicas (19) to be made and the articulator assembly (1) of the two dental models (18) (upper and lower) in a single operation. To do this, it is placed on each arm (5) of the articulator (1) the platen (7) with its magnets (8) at the height (h), protruding from its surface, said platen (7) being fitted in the lower recess (13) of a tray (2), and in the internal and upper part of said trays (2), the pins (3) are fitted in the holes (12) and in contact with said magnets (8). The articulator (1) is opened and a plaster casting is then poured into each tray (2) onto the pins (3) and once the plaster casting has set sufficiently, but still maintaining sufficient plasticity, the articulator (1) can be closed, reproducing the relationship (h), thus creating the respective bases (20), upper and lower, this keeping the plaster from coming off or falling and leaving the pins (3) embedded in the bases (20) of the dental model (21) and positioned and magnetically fixed to the magnets (8) of the platen (7) of the articulator (1).

When the double positioner (4) is linked by its clamping element (21) to the rotation axis (10) of the articulator (1) and is placed in a horizontal position, for example when closing the articulator (1), as seen in FIG. 1, it rests on the shelf (26) of the articulator (1); In this position the dental replicas (19) that carry said double positioner (4) adhere to the plaster of each tray (2) and to the pins (3), creating the dental models (18) that, constructively contain the dynamic relationship of the denture as it has been made in the double positioner (4), thus leaving the dental models (18) perfectly clean and centered in the articulator (1).

Naturally, the dental models (18) can be made in a double step, as can be seen in FIG. 3. First, the upper dental model (18) is made and mounted. Next, the bite of the lower dental replica (19) is reproduced with the upper dental model (18), which is previously mounted to the platen (7) of the articulator. A tray (2) must now be placed on the platen (7) located on the opposing arm of the articulator, the tray (2) being prepared as in the previous example, with the platen (7) in its lower recess (13), the protrusions or magnets (8) and pins (3) in mutual contact, the latter plugging the holes (12) of the tray (2). The plaster cast is poured inside the tray (2) and onto the pins (3), the articulator is closed up to the "master" or (h) relationship and, when the cast sets, the "just created" lower dental model (18) is separated from the platen and the tray (2). In this way, it is achieved that when repositioning the dental model (18) onto the platen (7), the pins (3) of the base (20) of the dental model (18) are the only ones that contact the protrusions or magnets (8) of the platen (7) of the articulator.

In summary of the above, the professional must establish the dynamic relationship of the desired teeth, the patient's bite, between the dental replicas (19), upper and lower, close the articulator so that the lower part of the dental replica (19) sinks into the plaster, thus joining to its own base (20) with the pins (3) and together forming the dental models (18) articulated and related to each other with respect to the magnets or protrusions (8) of the platens (7) of the articulator and always within the relation "master" (h). In both processes, and thanks to the fixing and positioning system between pins (3), tray (2) and magnets (8) of the platen (7), the same plaster cast that is used to make the base (20) of the dental replica (19), is the one that is attached to the pins (3) to make, fix and position the dental model (18). This casting is the same as one used as a plaster for mounting the articulator, since the pins are the only ones that are in contact with the magnets or protrusions (8) of the platen (7) of the articulator, thus saving the double process known in the prior state of the art, of preparing the base of the dental model and assembling it in an articulator in two processes or plaster castings.

As stated in the section describing the advantages obtained with the present invention, one of them is that it allows the use of articulators currently on the market, other than the articulator (1) of the present invention. This makes it possible to make dental models (18) or use those obtained by means of the articulator (1) of the present invention in different articulators, with the only condition that the separation between their articulated arms is greater than the height or "master" (h) relationship defined between the plates (7) of the present invention.

FIG. 10 shows a platen positioner (25) having the "master" height (h) of the articulator (1). It has at least three vertices, each one of them containing a surface coinciding with the underside of the pins (3), which would be attached to the protrusions or magnets (8) of the platen (7). That is, the platens (7) can be mounted with their magnets (8) centered on themselves. Since its height is the "master" (h), attached to platens (7) on the outside, the one that does not contact in the lower recess (13) of the tray (2), a plaster can be created that adapts each articulator to cover that height. For example, a layer of fixed plaster can be created between the arms of an articulator or platens on the market and a pair of platens (7) connected to the platen positioner (25).

This type of adapter allows the dental models (18) created with the present invention to be used in any of the known, indeed on the condition that they have greater separation between the arms than the "master" (h) of the platens (7) from the articulator (1). At the same time, once any articulator has been adapted to the present invention, and as long as the platens (7) remain in it, dental models (18) can be made from dental replicas, (19), or their duplicates, in this articulator, that is, the capping, duplication and assembly of the dental models (18) in the same process and in any articulator. This is thanks to the "master" (h) relationship of the magnets or protrusions (8) of the platens (7) and their use linked with the tray (2) and the pins (3) to the bases (20) of the dental models (18).

The invention, as previously stated, allows the use of dental replicas obtained by scanning the mouth, CAD/CAM software and 3D manufacturing of dental models (18). It is, succinctly, a process of creating the bases of union of said pins (3) to the dental replicas (19), obtained by means of an intra-oral scanner, so that they can be linked to the magnets (8) of the platen (7) to the articulator (1) or to any existing platen or articulator on the market. To do this, it is necessary to previously enter the relationship "master" (h) in the design software, which allows positioning and relating the two virtual platens (7). Next, once the virtual replicas are centered, their bases (20) are related to the virtual pins (3) thus creating the virtual dental model (18) without the pins.

Once the dental replica (19) with its base (20) has been manufactured, without the pins (3), using CAD/CAM from the virtual model, the pins (3) are placed on the bases (20) and the dental model (18) is created, and the latter can already be positioned to the magnets or protrusions (8) of the platen (7) in the articulator (1) or in any previously adapted articulator by means of the platen positioner (25). The production procedure can be the one previously described for the manual obtaining of a dental model (18), thus benefiting from the standardization of the dental models (18) obtained by the present invention, which allows the use of a large number of already existing articulators and the independence of the dental model (18) from the articulator to which it can be mounted and from which it can be detached, without losing the mechanical relationships previously established in the dental model (18).

The information of the three-dimensional plane of the dental model (18) with respect to the protrusions or magnets (8) of the platens (7) within the relation "master" (h) is available thanks to a minimum of three pins (3) embedded in the base (20) of the dental model (18). The "master" (h) relationship between the magnets or protrusions (8) of the platens (7) allows the adaptation of the present invention to any articulator or CAD/CAM design software.

Another embodiment of the present invention refers to the duplication of dental models (18). This in the known art is a time consuming and tedious task to perform. The duplicate cast is made first, and then the duplicate casts are mounted in the articulator. They are two different processes. In the present invention it can be greatly simplified. Briefly, by means of a suitable tray, as the one shown in FIG. 14, with sufficient wall height, but with the structure of the tray (2), represented in FIGS. 4, 5 and 6. With this tray, a negative copy or mold of the dental model (18) to be duplicated can be made.

Figure 14:
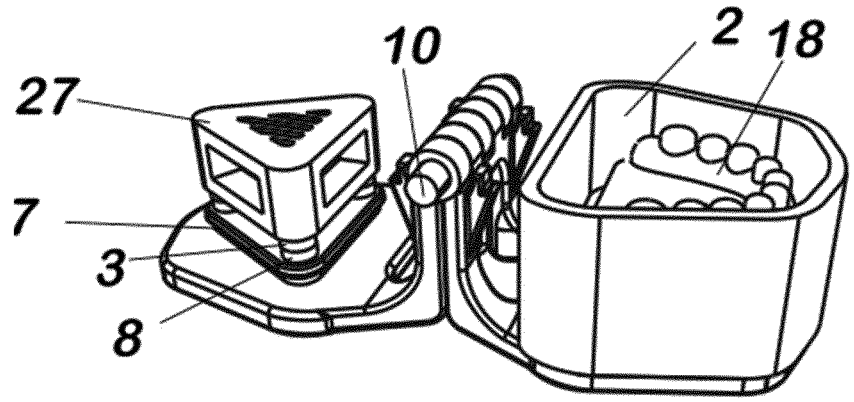
FIG. 14 is a perspective view of an articulator in an open position and with the positioner for the duplicating mold on a platen, while on the other arm is the duplicating tray with the dental model to be duplicated.

The tray (2) is positioned thanks to its recess (13) on the platen (7) of the articulator with the magnets (8) passing through the holes (12) of the tray (2) and the dental model (18) is fixed by its pins (3), as shown in FIG. 14. The positioner of the duplicate mold (27), which has a minimum of three pins (3) is located on top of the magnets (8) of the antagonist platen (7). Inside the tray (2), with the dental model (18) to be duplicated fixed and positioned by means of the pins (3) to the magnets or protrusions (8) of the platen (7), the material is poured to make the mold for the creation of the duplicate, for example, silicone, and the articulator is closed as far as the "master" (h) relationship, and until it reaches the irregularities of the positioner of the duplicate mold (27) and, when the silicone sets, the dental model (18) is removed and a negative or mold of the dental model is obtained fixed to the irregularities of the positioner of the mold for duplication (27), with its pins (3) at its base (20) already fixed and positioned at the magnets (8) of the platen (7) of the articulator.

Next, the pins (3) are placed on the magnets (8) of the antagonist platen (7), and subsequently the mold is filled with material to duplicate the dental model (18), for example, coating plaster, and the articulator is closed as far as the stop that defines the master height (h) until the pins (3) placed on the magnets (8) of the opposing platen (7) are embedded in the base of the material used to duplicate the dental model (18). In this way, the base (20) of the duplicated dental model (18) is made, and the same is positioned and fixed by means of the pins (3) embedded in its base (20) to the magnets (8) of the platens (7) of the articulator, in a single process.

The examples described in this specification are mere illustrations of the use and realization of the device described in claim 1. It is understood that in the present case, any and all details and shape finishes do not alter or modify the essence of the invention may be vary, it being possible other realization embodiments and uses that are considered to be included in the invention. The additional claims describe those forms and embodiments within the invention.

The invention claimed is:

1. A dentistry device for making, duplicating and fixing dental models to an articulator, the dentistry device comprising:
two platens, each platen having at least three fixing elements protruding from a surface of the platen;
at least three pins, each of the pins having a fixing means to fix the pins to a base of a dental model, each of the pins further comprising a protrusion or lower cavity and, each of the fixing elements having a complementary protrusion or lower cavity configured to mate with the protrusion or lower cavity of a corresponding one of the pins;
a tray made of an elastic material, the tray configured as a mold for making the base for a dental model, the tray is a container having a bottom with a plurality of holes, the fixing elements of the platen are capable of fitting in the plurality of holes from below and the pins are capable of being fixedly placed from above in the plurality of holes by the fixing element so that the plurality of holes are plugged;
an articulator comprising two arms, each arm having a stop, the stops configured to stop movement of the articulator at a maximum closure position of the articulator, each arm further comprising a base surface configured to receive one of the platens, in the maximum closure position, the base surfaces are held in a position parallel to one another thus maintaining a predefined separation between end surfaces of the fixing elements when the platens are positioned on the base surfaces of the articulator;
a double positioner that is attachable to the articulator, the double positioner comprising a hollow body in which a dental replica to make the dental model is arrangeable and adjusted to reproduce a patient's bite;
a platen positioner that is attachable to the articulator, the platen positioner comprising two opposite end surfaces parallel to each other, the end surface are in a shape of a geometric figure with a minimum of three vertices, each end surface having a fixing and/or positioning element arranged in each of the vertices and configured to mate with the fixing elements of the platens when the platen positioner is attached to the articulator;
the dental device is configured to establish a detachable connection between a dental model in a pre-established and reproducible relationship.

2. The dentistry device according to claim 1, wherein the fixing means of each of said pins (3) comprises pin interlocking elements (15) which are configured to engage said base of the dental model and fix each of said pins (3) to said base (20) of the dental model (18).

3. The dentistry device according to claim 1, wherein the cavity or the protrusion of each of said fixing elements (8) and the protrusion or the lower cavity of each of the pins forms a separable mechanical connection therebetween and are magnets that form a magnetic connection therebetween.

4. The dentistry device according to claim 1, wherein the at least three fixing elements (8) and the at least three pins (3) make a box and tenon joint, said protrusions (8) of each of the fixing elements fit into the cavities of each of said pins (3), or conversely, creating between said at least three pins and said at least three fixing elements (3 and 8) an adjustment plane between the platen (7) and the dental model (18) when fixed to the at least three pins.

5. The dentistry device according to claim 1, wherein said tray (2) has a recess (13) on a lower face thereof, and said recess (13) is configured for placement of said platen (7).

6. The dentistry device according to claim 1, wherein said tray (2) has an internal perimeter socket configured to receive a peripheral projection (6) of said platen (7).

7. The dentistry device according to claim 1, wherein said articulator (1) has horizontal support shelves (26) which support the double positioner when attached to the articulator.

8. The dentistry device according to claim 1, wherein said double positioner (4) has fasteners (21) that couple the double positioner to the articulator along a horizontal axis (10) of said articulator (1) such that the double positioner is rotatably about the horizontal axis.

9. The dentistry device according to claim 8, wherein when said double positioner (4) is joined to the articulator (1) by said fasteners (21), the fasteners contact support shelves (26) of said articulator (1).

10. The dentistry device according to claim 1, wherein said double positioner has fixing means (22) configured to contact and fix said dental replica (19) in said double positioner (4), said fixing means comprising silicone, tips (22), nails or screws of suitable dimensions, and an adhesive, wax or silicone, to immobilize said dental replica (19).

11. The dentistry device according to claim 1, wherein said platen positioner (25) has a height that is equal to the predefined separation between the end surfaces of said fixing elements of said platens when the platens are positioned of the base surfaces of said articulator (1).

12. The dentistry device according to claim 1, further comprising a platen positioner for a duplicate mold, wherein said platen positioner for a duplicate mold (27) has a height that is about half or less than half of a distance of the predefined separation between the end surfaces of said fixing elements of said platens when the platens are positioned of the base surfaces of said articulator.

13. A dentistry device for making dental models from dental replicas, duplicating the dental models and fixing the dental models to an articulator to accurately reproduce a patient's bite, the dentistry device comprising:
two platens, each platen having at least three fixing elements protruding from a surface of the platen;

at least three pins, each of the pins having a fixing means at one end thereof to fix the pins to a base of a dental model, each of the pins further comprising a protrusion or lower cavity at an opposite end thereof and, each of the fixing elements having a protrusion or lower cavity at an end thereof that is configured to mate with the protrusion or lower cavity of a respective one of the pins;

a tray made of an elastic material, the tray configured as a mold for making the base of the dental model, the tray is a container having a bottom with a plurality of holes, the fixing elements of the platen are capable of fitting in the plurality of holes and the pins are capable of being fixedly placed in the plurality of holes by the fixing element so that the plurality of holes are plugged;

an articulator comprising two arms, the arms having a stop that stops movement of the arms relative to each other at a maximum closure position of the articulator, each of the arms further comprising a base surface configured to receive one of the platens, in the maximum closure position, the base surfaces are held in a position parallel to one another thus maintaining a predefined separation between the ends of the fixing elements when the platens are positioned on the base surfaces of the arms of the articulator;

a double positioner that is attachable to the articulator, the double positioner comprising a hollow body in which a dental replica to make the dental model is arrangeable and adjusted to reproduce the patient's bite;

a platen positioner that is attachable to the articulator, the platen positioner comprising two opposite end surfaces, each of the end surfaces of the platen positioner is in a shape of a geometric figure with a minimum of three vertices, each of the end surfaces has a fixing and/or positioning element arranged in each of the vertices and configured to mate with the fixing elements of the platens when the platen positioner is attached to the articulator;

the dental device is configured to establish a detachable connection between a dental model in a pre-established and reproducible relationship.

\* \* \* \* \*